UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVER.

1,066,720.     Specification of Letters Patent.     Patented July 8, 1913.

No Drawing.     Application filed September 25, 1907. Serial No. 394,527.

*To all whom it may concern:*

Be it known that I, CARLETON ELLIS, a citizen of the United States, and resident of Larchmont, in the county of Westchester and State of New York, have made a certain new and useful Invention Relating to Finish-Removers, of which the following is a specification.

This invention relates to finish removers and relates especially to removers of an emulsified character in which the emulsifier is preferably substantially immiscible with the finish solvents employed and contains bleaching agents capable of acting on weather-stained material.

Casein or other gelatinous or proteid bodies may be dissolved in suitable aqueous mediums which may comprise bleaching agents capable of acting on weather stained wood. Oxalic, phosphoric or similar polybasic acids may be used as bleaching agents, as well as suitable salts of such acids, such, for example, as sodium or ammonium hydrogen oxalates, although it is not necessary that in all cases the acid salts be employed. A 2% aqueous solution of oxalic acid may be used to dissolve the proteid material, such as casein, which may be done by heating to a moderate temperature on a water bath or otherwise. When casein has been dissolved to the extent of 5% or so in such aqueous medium a thick, creamy emulsifier is produced which becomes stiffer as more casein is incorporated. A 10% casein solution of this character is a quite stiff jelly. 7½% of casein combined in this way forms a very desirable emulsifier giving a good body to the remover. Other gelatinous or proteid bodies may be used to give the desired viscosity to the emulsifier, such as glue, isinglass, Chinese gelatin, starch, Irish moss, and so forth.

When the emulsifier has been prepared the finish solvent material may be thoroughly incorporated therewith by agitation in a suitable emulsifying apparatus, the solvent material being preferably such as to be substantially, that is, to a large extent at least, immiscible with the aqueous portion of the emulsifier so that they are kept in such condition and concentration as to operate properly on the finish to which the remover is applied. The finish solvent material may comprise suitable loosening solvent material, that is, solvents of a generally alcoholic character or action, such loosening solvent material including of course, ketonic solvents. Crude or quasi allyl alcohol obtained in wood alcohol production and sold under the name of allyl alcohol is largely immiscible or insoluble in water as is also amyl alcohol in its commercial form, fusel oil; as well as the wood tar oils which are loosening solvents having a generally similar action in removers. Various derivatives of these solvents may also be used, such as amyl acetate, amyl butyrate and the products of esterification of allyl alcohol with the lower organic acids of the formic acid series. Other loosening solvent material may, of course, be employed in the remover when desired, such as the strict alcohols, methyl, allyl, propyl and benzyl alcohols and corresponding aldehydes which may be used in their cheaper commercial forms, if desired, such as denatured alcohol and other loosening solvents having a generally similar action, such as methyl acetone, acetone and other ketones, acetone oil, light tar oil, resin oil, resin spirits and so forth, and various derivatives thereof, including wood alcohol esters sold under the name of esters by wood alcohol manufacturers. Suitable penetrating solvent material, that is, solvents of a generally benzolic character or action may also be used in such removers, including benzol, toluol, xylol, cumene, as well as the petroleum products, benzin, gasolene, and so forth, and also carbon bisulfid, carbon-tetrachlorid and other chlorinated compounds, such as acetylene chlorid.

A typical illustrative remover of this character may comprise 100 parts of an acid emulsifier containing 7½% of casein dissolved in a 2% water solution of oxalic acid; 20 parts of benzol, 40 parts of amyl acetate, 10 parts of benzyl aldehyde and 30 parts of benzyl alcohol. Another typical illustrative remover may comprise 10 parts of a bleaching emulsifier comprising a 10% solution of casein in a similar acid aqueous solution, 4 parts of quasi allyl alcohol and 3 parts of benzol. Another illustrative remover may comprise 4 parts of an emulsifier consisting of a 6% solution of casein in a 15% aqueous solution of ammonium acid oxalate, 2 parts of resin spirits and 2 parts of oil of wood tar. Another illustrative remover may comprise an emulsifier containing 5% of casein dissolved in a 2% acid solution of oxali acid in water combined with 4 parts of amyl alcohol.

This invention has been described in connection with a number of illustrative ingredients, formulas, proportions and processes, to the details of which disclosure the invention is not, of course, to be limited.

What is claimed is:—

1. The emulsified remover comprising approximately 100 parts of an acid emulsifier containing 7½% of casein dissolved in a 2% aqueous solution of oxalic acid, 20 parts of benzol, 40 parts of amyl acetate, 10 parts of benzyl aldehyde, and 30 parts of benzyl alcohol.

2. The emulsified finish remover comprising approximately 100 parts of an emulsifier containing 7½% of casein dissolved in an aqueous solution containing free oxalic acid, 20 parts of penetrating solvent material and 80 parts of loosening solvent material substantially immiscible with the emulsifier.

3. The emulsified finish remover comprising approximately 100 parts of an emulsifier consisting of a gelatinous solution of casein in an aqueous solvent containing free oxalic acid and 100 parts of loosening and penetrating solvent material substantially immiscible with the emulsifier.

4. The emulsified finish remover comprising an emulsifier containing casein and an acid bleaching agent dissolved in water and substantially water immiscible loosening finish solvent material.

5. The emulsified finish remover comprising an emulsifier containing casein, acid bleaching material and volatile substantially water immiscible loosening finish solvent material.

6. The emulsified finish remover comprising an emulsifier containing proteid material and acid wood bleaching material incorporated with substantially as large an amount of composite substantially water-immiscible volatile finish solvent material.

7. The emulsified finish remover comprising an aqueous emulsifier containing an acid bleaching agent incorporated with substantially as large an amount of composite finish solvent material substantially immiscible therewith.

CARLETON ELLIS.

Witnesses:
RALPH W. PEAKES,
JESSIE B. KAY.